Patented Mar. 14, 1944

2,344,213

UNITED STATES PATENT OFFICE 2,344,213

PRODUCTION OF POLYMERIZATION PRODUCTS FROM ISOBUTYLENE

Michael Otto, Ludwigshafen-on-the-Rhine, Germany; vested in the Alien Property Custodian No Drawing. Application May 23, 1939, Serial No. 275,323. In Germany May 24, 1938

8 Claims. (Cl. 260—93)

The present invention relates to improvements in the production of polymerization products from isobutylene either alone or in mixture with diolefines.

It is already known that high molecular weight polymerization products are obtained when isobutylene is polymerized with the aid of catalysts of the Friedel-Crafts' reaction, as for example aluminum chloride or bromide, iron chloride, tin chloride, titanium chloride or preferably boron fluoride, at temperatures below 10° below zero C. The molecular weight of the polymerization products is greater the lower the temperature during the polymerization and the purer the initial material. For example, if pure liquid isobutylene be polymerized in the presence of a liquid diluent, such as for instance propane, with the aid of boron fluoride at 80° below zero C., polymerization products are obtained having an average molecular weight of about 70,000. On the other hand, by working at 103° below zero C., the products obtained have molecular weights of 150,000 to 200,000 or more. If, however, the isobutylene is not quite pure but contains for example unsaturated hydrocarbons, such as for instance propylene, normal-butylene, amylene, hexylene or octylene, or also ketones, aldehydes, ethers or esters, there are formed at the same temperatures polymerization products of considerably lower molecular weight, as for example at 103° below zero C. a product of which the molecular weight amounts to only from about 10,000 to 15,000.

I have now found that the course of the polymerization of isobutylene is favorably influenced by working in the presence of small amounts of substances which are soluble in the reaction mixture under the working conditions and which further have the property of being capable of dissolving boron fluoride and which with boron fluoride either form double compounds or hydrolizes the same with the intermediate formation of hydrogen fluoride. The favourable action of these substances is evident, however, not only when working with boron fluoride as the catalyst but also when employing other catalysts of the Friedel-Crafts' reaction, as for example aluminum chloride or bromide, iron chloride, tin chloride or titanium chloride. The aforesaid substances, which are added in small amounts, may be called accelerators. Suitable accelerators are for example sulphuric acid, nitric acid, caproic acid, trichloracetic acid, formaldehyde, phenol, cresol, and monohydric aliphatic, cycloaliphatic or aromatic alcohols. Suitable alcohols are for example methanol, ethyl alcohol, isobutyl alcohol, octyl alcohol, cyclohexanol, and benzyl alcohol.

The favourable action of these accelerators results either in products having a higher molecular weight being formed, or in the reaction proceeding more rapidly than without the said additions, or in the possibility of carrying through the polymerization by means of considerably smaller amounts of the catalysts of the Friedel-Crafts' reaction. In many cases several of these advantages are attained at the same time. Generally speaking, it is observed that the course of the polymerization can be controlled in a much better manner than hitherto in that the resulting polymerization products do not contain any substantial amounts of unaltered initial materials whereby the advantage is obtained when carrying through the polymerization, for example, on an endless conveyer belt as described in the U. S. application of myself and others Ser. No. 194,608, filed March 8, 1938, that the reaction mass is not converted into the form of a spray of liquid droplets or small solid pieces which are thrown away from the conveyer belt.

When polymerizing isobutylene alone, the accelerators are added to the isobutylene to be polymerized in small amounts, as a rule of not more than 0.5 per cent. The most favourable amount depends on the reaction conditions and on the additional substance selected. Amounts of 0.01 per cent or slightly more are often sufficient. Also in the production of interpolymerization products of isobutylene and diolefines amounts of less than 0.5 per cent are often sufficient, but it may be of advantage, as for example when using cyclohexanol as the accelerator, to use somewhat larger amounts, as for example up to 1 per cent.

When producing interpolymerization products of isobutylene and diolefines such diolefines are preferably used as have conjugated double linkages, as for example butadiene, isoprene, dimethylbutadiene or chlorbutadiene. The relative proportions of isobutylene and diolefine may be selected according to the desired properties of the finished product. As a rule it is preferable not to employ too large an amount of diolefines. It is advantageous to work with from 5 to 40 parts by weight of diolefine to from 95 to 60 parts of isobutylene.

The interpolymerization products obtained may, like rubber, be vulcanized. After vulcanization they have extraordinarily high strength and are equal in this respect to the high molecular polymerization products of isobutylene alone, even when their molecular weight is considerably lower, or they are even superior to the isobutylene polymerization products.

The following examples will further illustrate how the present invention may be carried out in practice, but the invention is not restricted to these examples. The parts are by volume unless otherwise stated.

Example 1

From industrial isobutyl alcohol there is obtained by careful distillation a fraction boiling between 106.8° and 108.6° C. This is converted by splitting off water into isobutylene which is again distilled very slowly and cautiously. 20 parts of the liquid isobutylene thus obtained are mixed with from 40 to 60 parts of liquid ethylene and treated at 103° below zero C. with the amounts of isobutyl alcohol and boron fluoride specified in the following table. There are thus obtained within the times specified polymerization products having the average molecular weights specified.

| Parts of gaseous boron fluoride | 28 | 40 | 60 | 100 | 160 |
|---|---|---|---|---|---|
| 0 per cent of isobutyl alcohol: Molecular weight | 95,000 | ---- | 235,000 | 238,000 | 240,000 |
| Reaction time in seconds | Abt. 400 | ---- | 250 | 130 | 50 |
| 0.01 per cent of isobutyl alcohol: Molecular weight | ---- | 284,000 | 290,000 | 274,000 | 252,000 |
| Reaction time in seconds | ---- | 90 | 60 | 30 | 18 |
| 0.1 per cent of isobutyl alcohol: Molecular weight | 296,000 | 285,000 | 280,000 | 256,000 | ---- |
| Reaction time in seconds | 30 | 20 | 18 | 9 | ---- |
| 0.3 per cent of isobutyl alcohol: Molecular weight | 285,000 | 283,000 | 278,000 | 265,000 | ---- |
| Reaction time in seconds | 15 | 13 | 7 | 5 | ---- |
| 0.5 per cent of isobutyl alcohol: Molecular weight | 248,000 | 275,000 | 270,000 | 267,000 | ---- |
| Reaction time in seconds | Abt. 10 | Abt. 8 | Not measurable | Not measurable | ---- |

By working in the same way with methanol, the results given in the following table are obtained:

| Parts of gaseous boron fluoride | 28 | 40 | 60 | 100 |
|---|---|---|---|---|
| 0 per cent of methanol: Molecular weight | 95,000 | ---- | 235,000 | 238,000 |
| Reaction time in seconds | Abt. 400 | ---- | 250 | 130 |
| 0.01 per cent of methanol: Molecular weight | 261,000 | 265,000 | 250,000 | 253,000 |
| Reaction time in seconds | 100 | 30 | 20 | 15 |
| 0.05 per cent of methanol: Molecular weight | 240,000 | 252,000 | 225,000 | 223,000 |
| Reaction time in seconds | 30 | 23 | 18 | 10 |

Example 2

Industrial isobutyl alcohol is converted by splitting off water into isobutylene and the latter purified by cautious distillation. If it be polymerized in the manner specified in Example 1, but with the addition of ethyl alcohol, the following results are obtained:

| Parts of gaseous boron fluoride | 28 | 40 | 60 | 100 |
|---|---|---|---|---|
| 0 per cent of ethanol: Molecular weight | ---- | ---- | 152,000 | 155,000 |
| Reaction time | ---- | ---- | 100 | 40 |
| 0.01 per cent of ethanol: Molecular weight | 194,000 | 198,000 | 220,000 | 200,000 |
| Reaction time | 65 | 35 | 12 | 8 |
| 0.05 per cent of ethanol: Molecular weight | 160,000 | 203,000 | 194,000 | 178,000 |
| Reaction time | 60 | 23 | 10 | 6 |
| 0.1 per cent of ethanol: Molecular weight | 97,000 | 175,000 | 200,000 | 175,000 |
| Reaction time | 30 | 20 | 10 | 5 |
| 0.3 per cent of ethanol: Molecular weight | 121,000 | 173,000 | 190,000 | 142,000 |
| Reaction time | 50 | 21 | 7 | 3 |

Example 3

Pure isobutylene is prepared as described in Example 1 and polymerized as therein described, benzyl or octyl alcohol being used as the additional substance. The results are given below:

| Parts of gaseous boron fluoride | 20 | 40 | 80 |
|---|---|---|---|
| 0 per cent of benzyl alcohol: Molecular weight | 200,000 | 240,000 | 245,000 |
| Reaction time (seconds) | 200 | 110 | 50 |
| 0.1 per cent of benzyl alcohol: Molecular weight | 276,000 | 274,000 | 268,000 |
| Reaction time (seconds) | 35 | 30 | 16 |
| 0.2 per cent of benzyl alcohol: Molecular weight | 273,000 | 262,000 | 255,000 |
| Reaction time (seconds) | 46 | 22 | 14 |
| 0 per cent of octyl alcohol: Molecular weight | 200,000 | 240,000 | 245,000 |
| Reaction time (seconds) | 200 | 110 | 50 |
| 0.01 per cent of octyl alcohol: Molecular weight | 262,000 | 270,000 | 250,000 |
| Reaction time (seconds) | 80 | 50 | 28 |
| 0.03 per cent of octyl alcohol: Molecular weight | 260,000 | 253,000 | 251,000 |
| Reaction time (seconds) | 65 | 30 | 18 |

Example 4

Isobutyl alcohol boiling at from 104° to 109° C. is dehydrated, the resulting crude isobutylene distilled and then polymerized in the manner described in Example 1 with the addition of cyclohexanol. The results are as follows:

| Parts of gaseous boron fluoride | 20 | 40 | 80 | 120 | 160 |
|---|---|---|---|---|---|
| 0 per cent of cyclohexanol: | | | | | |
| Molecular weight | 235,000 | 216,000 | 184,000 | 176,000 | 162,000 |
| Reaction time | 140 | 100 | 50 | 25 | 20 |
| 0.01 per cent of cyclohexanol: | | | | | |
| Molecular weight | 250,000 | 240,000 | 206,000 | 190,000 | 168,000 |
| Reaction time | 80 | 50 | 30 | 14 | 10 |
| 0.03 per cent of cyclohexanol: | | | | | |
| Molecular weight | 254,000 | 240,000 | 220,000 | 197,000 | 170,000 |
| Reaction time | 70 | 35 | 18 | 12 | 8 |
| 0.05 per cent of cyclohexanol: | | | | | |
| Molecular weight | 254,000 | 235,000 | 220,000 | 212,000 | 200,000 |
| Reaction time | 60 | 30 | 20 | 10 | 7 |
| 0.1 per cent of cyclohexanol: | | | | | |
| Molecular weight | 248,000 | 252,000 | 214,000 | 203,000 | 190,000 |
| Reaction time | 24 | 20 | 10 | 7 | 5 |

Example 5

Pure isobutylene is polymerized as described in Example 1 but with an addition of phenol. In order to obtain the same reaction time it is only necessary to use when adding phenol about one-tenth to one fifteenth of the amount of catalyst which must be used for polymerization without the addition of phenol, as may be seen from the following table:

| Parts of gaseous boron fluoride | Without phenol | |
|---|---|---|
| | m. w. | r. t. sec. |
| 20 | 220,000 | 75 |
| 40 | 215,000 | 43 |
| 80 | 206,000 | 15 |
| 120 | 203,000 | 12 |
| 160 | 180,000 | 10 |

| Parts of gaseous boron fluoride | 0.0025% phenol | | 0.005% phenol | |
|---|---|---|---|---|
| | m. w. | r. t. sec. | m. w. | r. t. sec. |
| 2 | 150,000 | 75 | 147,000 | 45 |
| 4 | 156,000 | 60 | 170,000 | 30 |
| 6 | 162,000 | 40 | 166,000 | 20 |
| 8 | 170,000 | 20 | 170,000 | 18 |
| 10 | 170,000 | 14 | 170,000 | 11 |

Example 6

Instead of the phenol used in Example 5, the compounds specified below are added and the reaction times determined when 30 parts of gaseous boron fluoride are used for the polymerization. The results are as follows:

| Addition | Reaction time in seconds |
|---|---|
| Without addition | 70 |
| 0.1 per cent of formaldehyde | 25 |
| 0.1 per cent of crude cresol | 2 |
| 0.15 per cent of sulphuric acid | 4 |
| 0.15 per cent of nitric acid | 25 |
| 0.1 per cent of trichloracetic acid | 10 |

Example 7

Pure isobutylene is obtained by splitting off water from isobutyl alcohol boiling at from 105° to 109° C. and distilling the resulting isobutylene. 20 parts of the liquid isobutylene obtained are mixed with from 40 to 60 parts of liquid ethylene and polymerized at 103° below zero C. with the amounts of boron fluoride given below with an addition of the specified amounts of caproic acid. The reaction time in seconds (r. t.) and the molecular weights (m. w.) of the polymerization products are given in the following table:

| Parts of gaseous boron fluoride | Percentage of caproic acid added | | | | | | | | | |
|---|---|---|---|---|---|---|---|---|---|---|
| | 0 | | 0.01 | | 0.03 | | 0.05 | | 0.1 | |
| | m. w. | r. t. | m. w. | r. t. | m. w. | r. t. | m. w. | r. t. | m. w. | r. t. |
| 20 | 245,000 | 75 | 268,000 | 150 | 258,000 | 70 | 255,000 | 60 | 233,000 | 90 |
| 40 | 233,000 | 40 | 262,000 | 60 | 258,000 | 60 | 247,000 | 30 | 216,000 | 30 |
| 80 | 210,000 | 25 | 243,000 | 40 | 233,000 | 25 | 230,000 | 20 | 210,000 | 20 |
| 120 | 180,000 | 16 | 235,000 | 29 | 226,000 | 20 | 228,000 | 18 | 255,000 | 11 |
| 160 | 178,000 | 11 | 220,000 | 18 | 215,000 | 13 | 216,000 | 12 | 240,000 | 7 |

Example 8

A mixture of 80 grams of liquid isobutylene to which 0.05 per cent of isobutyl alcohol has been added, and 20 grams of liquid butadiene is cooled to 103° below zero C. with 200 grams of liquid ethylene. A solution of 120 cubic centimeters of gaseous boron fluoride in about 50 cubic centimeters of liquid ethylene is then poured in. The reaction commences immediately and is mainly completed after about 500 seconds. The polymerization product obtained then immediately has methanol poured thereover in order to render any boron fluoride still present inactive. After removing the alcohol and ethylene, an interpolymerization product having a molecular weight of 20,000 is obtained.

By working under the same conditions, but without an addition of isobutyl alcohol, an interpolymerization product is obtained having a molecular weight of 14,000.

Example 9

A mixture of 320 grams of liquid isobutylene to which 0.1 per cent of isobutyl alcohol has been added, 80 grams of liquid butadiene and 600 grams of liquid ethylene is cooled to from about 130° to 140° below zero C. by pouring liquid methane therein. There are then poured in consecutively two batches each of 400 cubic centimeters of gaseous boron fluoride dissolved in about 50 cubic centimeters of liquid ethylene. The main reaction is completed after from about 4 to 5 minutes; methanol is then poured over and the alcohol, ethylene and methane removed. The interpolymerization product has a molecular weight of 68,000.

Instead of methane, ethylene alone may be used for obtaining the low temperature in sucking the same off under a vacuum of from about 50 to 100 millimeters (mercury gauge).

From the resulting interpolymerization product, the following mixture is prepared at 160° C. on the rollers:

| | Parts |
|---|---|
| Interpolymerization product | 100 |
| Stearic acid | 5 |
| Carbon black | 20 |
| Zinc oxide | 10 |

After cooling to 40° C. there are introduced:

| | Parts |
|---|---|
| Sulphur | 5 |
| Vulcanization accelerator | 1.5 |

The mixture is vulcanized for 90 minutes at 150° C. The vulcanizate thus prepared has a strength of 166 kilograms per square centimeter, an extension of 935 per cent, a recoil elasticity of 12 and a Shore hardness of 65 at 20° C.

If the polymerization be carried out without an addition of isobutyl alcohol, there is obtained with two batches each of 480 cubic centimeters of gaseous boron fluoride under otherwise the same conditions an interpolymerization product having a molecular weight of 31,500.

By using 1 per cent of cyclohexanol in the polymerization instead of isobutyl alcohol under the same conditions, an interpolymerization product is obtained having a molecular weight of 37,000.

*Example 10*

A mixture of 80 grams of liquid isobutylene to which 0.1 per cent of isobutyl alcohol has been added, and 20 grams of liquid butadiene is cooled by means of liquid methane to between 130° and 140° below zero C. Thereafter a solution of 165 cubic centimeters of gaseous boron fluoride dissolved in 100 cubic centimeters of liquid methane is slowly added. The reaction is complete after about 3 minutes. The resulting polymerizate is treated with methanol in order to destroy any boron fluoride still present. The product is then subjected to a rolling treatment while treating it with hot water whereby the alcohol and occluded gases are removed. An interpolymerization product having a molecular weight of 150,000 is obtained.

*Example 11*

When varying in the process of the foregoing example the proportions of isobutylene and butadiene mixed polymerizates are obtained which have the molecular weights and, after vulcanization, the strength values indicated in the following table. For carrying through the vulcanization the interpolymerizates are first dried at 120° C. in a kneading or rolling machine. Thereafter at 140° C. 100 parts by weight of the interpolymerization product are mixed by rolling with 40 parts of gas black, 5 parts of zinc oxide, 3 parts of sulphur and 3 parts of stearic acid during 20 minutes. The mass is then allowed to cool to about 80° C. and mixed at that temperature with 3 parts of mercaptobenzothiazole and 1 part of tetramethylthiuramdisulfide. The vulcanization is then effected by heating for 60 minutes to 155° C.

| Proportion of isobutylene to butadiene | Molecular weight of polymerization product | Load in kilograms for effecting an extension to | | Strength in kilograms per square centimeter | Extension at the moment of rupture in per cent |
|---|---|---|---|---|---|
| | | 300% | 500% | | |
| 75:25 | 100,000 | 41 | 109 | 207 | 720 |
| 70:30 | 67,500 | 13 | 35 | 184 | 907 |
| 67:33 | 100,000 | 53 | 134 | 183 | 621 |
| 60:40 | 63,500 | 20 | 54 | 184 | 861 |
| 50:50 | 80,000 | 66 | 155 | 177 | 521 |

What I claim is:

1. The process of producing polymerization products which comprises contacting a liquid containing a member of the group consisting of isobutylene and mixtures of a major portion of isobutylene and a minor portion of an olefinic compound having conjugated double bonds to which liquid there has been added a polymerization-promoting amount of up to 1% based on the isobutylene present of a compound which is soluble in the reaction mixture under the reaction conditions and capable of dissolving boron fluoride, said compound being selected from the group consisting of monohydric alcohols, phenol and cresol with a Friedel-Crafts reaction catalyst at a temperature below −10° C.

2. The process as claimed in claim 1 in which the liquid treated is liquid isobutylene.

3. The process as claimed in claim 1 in which the liquid treated essentially comprises isobutylene and a diolefine.

4. The process as claimed in claim 1 in which the liquid treated essentially comprises isobutylene and butadiene.

5. The process as claimed in claim 1 in which the added substance is a monohydric alcohol.

6. The process as claimed in claim 1 in which the added substance is a monohydric aliphatic alcohol.

7. The process as claimed in claim 1 in which the liquid treated is liquid isobutylene and the added substance is a monohydric aliphatic alcohol.

8. The process as claimed in claim 1 in which the liquid treated essentially comprises isobutylene and butadiene and the added substance is a monohydric aliphatic alcohol.

MICHAEL OTTO.